United States Patent
Funakawa et al.

(10) Patent No.: US 10,626,512 B2
(45) Date of Patent: Apr. 21, 2020

(54) CATHODE FOR ELECTROLYSIS AND METHOD FOR PRODUCING SAME, AND ELECTROLYTIC CELL FOR ELECTROLYSIS

(71) Applicant: ASAHI KASEI KABUSHIKI KAISHA, Tokyo (JP)

(72) Inventors: Akiyasu Funakawa, Tokyo (JP); Takayuki Hata, Tokyo (JP); Toshinori Hachiya, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 15/538,249

(22) PCT Filed: Dec. 22, 2015

(86) PCT No.: PCT/JP2015/085811
§ 371 (c)(1),
(2) Date: Jun. 21, 2017

(87) PCT Pub. No.: WO2016/104494
PCT Pub. Date: Jun. 30, 2016

(65) Prior Publication Data
US 2017/0350026 A1 Dec. 7, 2017

(30) Foreign Application Priority Data
Dec. 26, 2014 (JP) .................................. 2014-264303

(51) Int. Cl.
*C25B 11/08* (2006.01)
*C25B 11/04* (2006.01)
(Continued)

(52) U.S. Cl.
CPC ............ *C25B 11/0484* (2013.01); *C25B 1/06* (2013.01); *C25B 11/0405* (2013.01);
(Continued)

(58) Field of Classification Search
CPC .... C25B 1/04–1/12; C25B 1/26–1/265; C25B 1/34–1/46; C25B 11/00;
(Continued)

(56) References Cited

U.S. PATENT DOCUMENTS 4,010,091 A * 3/1977 Ravier ................. C01G 51/006
204/290.04
4,256,563 A 3/1981 Kubasov et al.
(Continued)

FOREIGN PATENT DOCUMENTS

GB 1415684 A 11/1975
JP 2000-239882 A 9/2000
(Continued)

OTHER PUBLICATIONS

Machine translation of JP 2006299395 A (Year: 2019).*
(Continued)

*Primary Examiner* — Alexander W Keeling
(74) *Attorney, Agent, or Firm* — Greenblum & Bernstein, P.L.C.

(57) ABSTRACT

Provided is a cathode for electrolysis comprising a conductive substrate and a Ru element-containing catalyst layer on the conductive substrate, wherein in the catalyst layer, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in an X-ray photoelectron spectroscopic measurement is 0.45 or more.

16 Claims, 10 Drawing Sheets

(51) Int. Cl.
  *C25B 1/06* (2006.01)
  *B01J 23/46* (2006.01)
  *C01G 55/00* (2006.01)

(52) U.S. Cl.
  CPC ........... *B01J 23/462* (2013.01); *C01G 55/004* (2013.01); *C01P 2002/72* (2013.01); *C25B 11/0431* (2013.01); *Y02E 60/366* (2013.01)

(58) Field of Classification Search
  CPC . C25B 11/04; C25B 11/0405; C25B 11/0442; C25B 11/0447; C25B 11/0473; C25B 11/0478; C25B 11/0484; C25B 11/0494; C01G 55/004; C01P 2002/72; B01J 23/46–23/462
  See application file for complete search history.

(56) References Cited

U.S. PATENT DOCUMENTS

| | | | |
|---|---|---|---|
| 4,900,585 | A | 2/1990 | Leroux et al. |
| 6,312,571 | B1 | 11/2001 | Nara et al. |
| 2004/0242412 | A1 | 12/2004 | Gulla et al. |
| 2008/0070084 | A1 | 3/2008 | Ishihara et al. |
| 2008/0099328 | A1 | 5/2008 | Arimoto |
| 2008/0230380 | A1* | 9/2008 | Ohsaka .................... C25B 1/04 204/290.09 |
| 2011/0259758 | A1 | 10/2011 | Sioli et al. |
| 2014/0008215 | A1 | 1/2014 | Brichese et al. |
| 2015/0027878 | A1 | 1/2015 | Funakawa et al. |

FOREIGN PATENT DOCUMENTS

| | | | |
|---|---|---|---|
| JP | 2006-299395 | A | 11/2006 |
| JP | 2006299395 | A * | 11/2006 |
| JP | 2008-133532 | A | 6/2008 |
| JP | 2008-240001 | A | 10/2008 |
| JP | 2014-517872 | A | 7/2014 |
| JP | 2014-221944 | A | 11/2014 |
| KR | 2003-0080536 | A | 10/2003 |
| RU | 2505624 | C2 | 1/2014 |

OTHER PUBLICATIONS

Supplementary European Search Report from Application No. 15873062.2 dated Nov. 9, 2017.
International Search Report issued with respect to Japan Patent Application No. PCT/JP2015/085811, dated Mar. 1, 2016.
International Preliminary Report on Patentability issued with respect to Japan Patent Application No. PCT/JP2015/085811, dated Jun. 27, 2017.

* cited by examiner

CATHODE FOR ELECTROLYSIS AND METHOD FOR PRODUCING SAME, AND ELECTROLYTIC CELL FOR ELECTROLYSIS

TECHNICAL FIELD

The present invention relates to a cathode used for the electrolysis of water or aqueous alkali metal compound solutions, in particular, a cathode for electrolysis usable for a hydrogen generating electrode and a method for producing the same, and an electrolytic cell for electrolysis.

BACKGROUND ART

A hydrogen generating cathode is used for the electrolysis (electrolyzation) producing hydrogen, chlorine, caustic soda or the like by electrolyzing water or aqueous solutions of alkali metal compounds (typically, alkali metal chlorides). In electrolysis industry, the reduction of energy consumption, specifically, the reduction of the electrolysis voltage is a significant problem. Recently, as the method for electrolyzing aqueous alkali metal chloride solutions such as an aqueous sodium chloride solution, the ion-exchange membrane method predominates, and various investigations have hitherto been performed. When electrolysis is actually performed, in addition to the theoretically determined voltage required for the electrolysis of sodium chloride, the overvoltage of the anode reaction (generation of chlorine), the overvoltage of the cathode reaction (generation of hydrogen), the voltage due to the resistance of the ion-exchange membrane, and the voltage due to the inter-electrode distance between the anode and the cathode are required. When attention is paid to the overvoltage due to the electrode reaction, of these voltages, a noble metal-based electrode referred to as the so-called DSA (Dimensionally Stable Anode) has been developed as an anode for chlorine generation; in the electrode concerned, the chlorine overvoltage is reduced largely so as to be 50 mV or less.

On the other hand, also for a cathode involving hydrogen generation, recently from the viewpoint of energy saving, a cathode being low in hydrogen overvoltage and having durability has been demanded. As a hydrogen generating cathode, soft steel, stainless steel and nickel have been formerly used. In addition, the activation of the surface of these hydrogen generating cathodes to reduce the hydrogen overvoltage has been investigated, and for these techniques, many patent applications have been performed. Examples of the catalyst for the hydrogen generating cathode include nickel, nickel oxide, an alloy of nickel and tin, a combination of activated carbon and an oxide, ruthenium oxide and platinum. The catalyst layers including these catalysts are formed by alloy plating, dispersion composite plating, thermal decomposition, thermal spraying and combinations of these.

In Patent Literature 1 (Japanese Patent Laid-Open No. 2000-239882), a catalyst layer composed of a lanthanum metal-based compound and a platinum group compound is formed, as a catalyst composition, on a conductive substrate, and thus, a cathode having a low overvoltage is formed. In Patent Literature 2 (Japanese Patent Laid-Open No. 2008-133532), ruthenium nitrate and a carboxylic acid salt of lanthanum are applied onto a conductive substrate, and calcined in the atmosphere to form a catalyst layer, and thus, the catalyst layer is stabilized over a long term even in a high current density operation. In Patent Literature 3 (Japanese Patent Laid-Open No. 2008-240001), a hydrogen adsorption layer is formed on a catalyst layer, and thus, the hydrogen generation efficiency is improved.

CITATION LIST

Patent Literature

Patent Literature 1: Japanese Patent Laid-Open No. 2000-239882
Patent Literature 2: Japanese Patent Laid-Open No. 2008-133532
Patent Literature 3: Japanese Patent Laid-Open No. 2008-240001

SUMMARY OF INVENTION

Technical Problem

As described above, for the purpose of reducing the electric power consumption, various attempts have been made, and various hydrogen generating cathodes have been proposed. However, there has never been obtained a hydrogen generating cathode having a sufficiently low hydrogen overvoltage, having a resistance against the reverse current at the cessation of electrolysis, and having a stable catalyst layer.

The present invention intends to solve the above-described problems, and an object of the present invention is to provide a cathode for electrolysis having a low hydrogen overvoltage and a resistance against the reverse current at the time of the cessation of electrolysis and a method for producing the same, and a electrolytic cell for electrolysis.

Solution to Problem

The present invention is as follows.
[1]
A cathode for electrolysis including a conductive substrate and a Ru element-containing catalyst layer on the conductive substrate, wherein in the catalyst layer, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in an X-ray photoelectron spectroscopic measurement is 0.45 or more.
[2]
The cathode for electrolysis according to [1], wherein in the catalyst layer, the ratio of the peak intensity of Ru oxide of the Miller index (101) plane observed in the angle domain of $2\theta=35°$ to the peak intensity of Ru oxide of the Miller index (110) plane observed in the angle domain of $2\theta=28°$ in an X-ray diffraction measurement is 1.5 or less.
[3]
The cathode for electrolysis according to [1] or [2], wherein the conductive substrate contains Ni.
[4]
The cathode for electrolysis according to any one of [1] to [3], wherein the catalyst layer includes, as a second component, at least one or more elements selected from Nd, Pm, Sm, Eu, Gd, Tb and Dy.
[5]
The cathode for electrolysis according to any one of [1] to [4], wherein the amount of the element(s) of the second component is 0.01 mol or more and less than 1 mol in relation to 1 mol of the Ru element.

[6]

The cathode for electrolysis according to [5], wherein the catalyst layer includes, as a third component, at least one or more elements selected from Mn, Fe, Co, Zn, Ga, S and Pb.

[7]

The cathode for electrolysis according to any one of [1] to [6], wherein the amount of the element(s) of the third component is 0.01 mol or more and less than 1 mol in relation to 1 mol of the Ru element.

[8]

The cathode for electrolysis according to any one of [4] to [7], wherein in the catalyst layer, at least either of the second component and the third component is present as an oxide or a hydroxide.

[9]

The cathode for electrolysis according to any one of [1] to [8], wherein the Ru element included in the catalyst layer is included as ruthenium oxide or ruthenium hydroxide.

[10]

The cathode for electrolysis according to any one of [1] to [9], wherein the supported amount of the Ru element is 1 to 20 g/m$^2$.

[11]

An electrolytic cell for water or an aqueous alkali metal chloride solution, including the cathode for electrolysis according to any one of [1] to [10].

[12]

A method for producing a cathode for electrolysis, wherein a catalyst layer is formed on a conductive substrate through:

an application step of applying, onto the conductive substrate, an application liquid including as a first component the Ru element, as a second component at least one or more elements selected from Nd, Pm, Sm, Eu, Gd, Tb and Dy, and as a third component at least one or more elements selected from Mn, Fe, Co, Zn, Ga, S and Pb;

a film formation step of forming a coating film by drying the application liquid; and a thermal decomposition step of heating and thermally decomposing the coating film.

[13]

The method for producing a cathode for electrolysis according to [12], wherein the first component included in the application liquid is at least one selected from a nitric acid salt, a dinitrodiammine complex, a nitrosyl nitrate, a chloride salt and an acetic acid salt;

the second component is at least one selected from a nitric acid salt, a chloride salt and an acetic acid salt; and the third component is at least one selected from a nitric acid salt, a chloride salt and an acetic acid salt.

[14]

The method for producing a cathode for electrolysis according to [12] or [13], wherein the application step, the film formation step and the thermal decomposition step are repeated two or more times.

[15]

The method for producing a cathode for electrolysis according to any one of [12] to [14], wherein the thermal decomposition step is performed at a temperature of 350° C. or higher and lower than 600° C.

[16]

The method for producing a cathode for electrolysis according to any one of [12] to [15], wherein before the thermal decomposition step, a preliminary calcination is performed at a temperature of 100° C. or higher and lower than 350° C. for 1 minute to 60 minutes.

[17]

The method for producing a cathode for electrolysis according to any one of [12] to [16], wherein in the film formation step, the drying of the application liquid is performed at a temperature of 100° C. or lower.

Advantageous Effects of Invention

According to the present invention, provided are a cathode for electrolysis, capable of being used for the electrolysis of water or an aqueous alkali metal compound solution, having a low hydrogen overvoltage and a resistance against the reverse current at the time of the cessation of electrolysis and a method for producing the same, and an electrolytic cell for electrolysis provided with the cathode for electrolysis.

DESCRIPTION OF EMBODIMENTS

Figure 1:
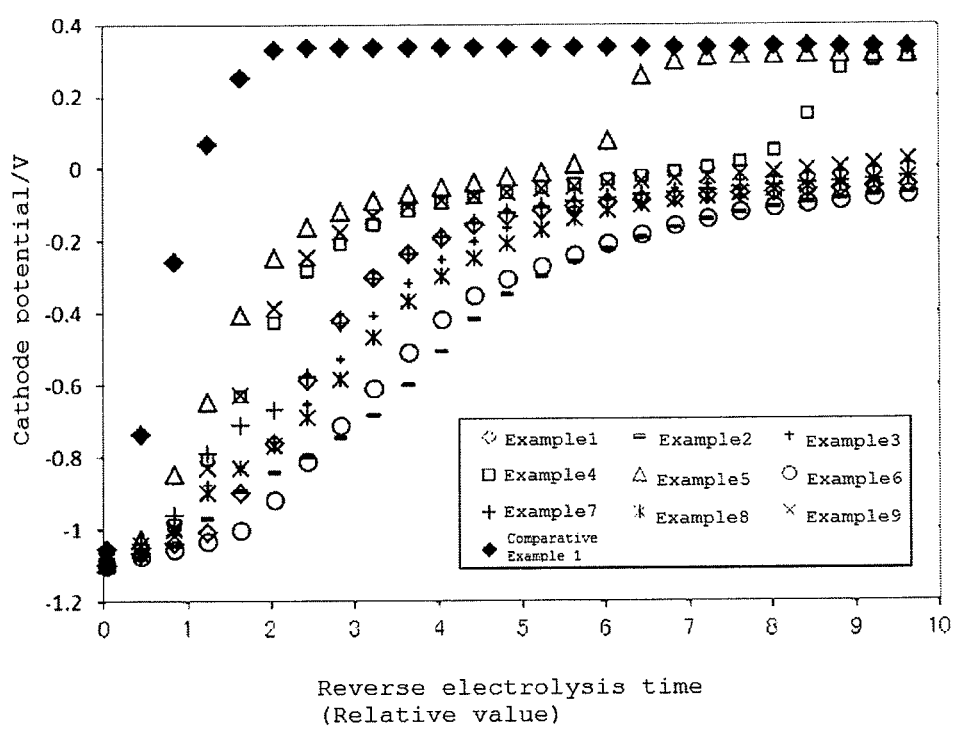
FIG. 1 is a graph showing the cathode potential increase behaviors in the reverse current application tests of the hydrogen generating cathodes obtained in Examples and Comparative Example.

The present inventors have discovered that in a cathode having a catalyst layer including ruthenium (Ru element) and being 0.45 or more in the ratio of the intensity of the Ru 3d 5/2 peak appearing between 281.4 eV and 282.4 eV to the intensity of the Ru 3d 5/2 peak appearing between 280.0 eV and 281.0 eV in an X-ray photoelectron spectroscopic measurement, the reverse current resistance is high and the hydrogen overvoltage is low. Here, "the ratio of the intensity of the Ru 3d 5/2 peak appearing between 281.4 eV and 282.4 eV to the intensity of the Ru 3d 5/2 peak appearing between 280.0 eV and 281.0 eV" means the ratio calculated from "the maximum peak intensity (cps) between 281.4 eV and 282.4 eV]/[the maximum peak intensity (cps) between 280.0 eV and 281.0 eV] (hereinafter, the ratio concerned is sometimes referred to as the "first intensity ratio").

The variation of the first intensity ratio is considered to originate from the variation of the electronic state of the Ru element. The peak between 280.0 eV and 281.0 eV is considered to be due to ruthenium oxide. On the other hand, the peak between 281.4 eV and 282.4 eV is considered to be due to ruthenium oxide in an electronic state different from the electronic state involved in the peak of ruthenium oxide appearing between 280.0 eV and 281.0 eV, or due to the hydroxide of ruthenium. Although the detailed principle has not yet been specified, the cause for the decrease of the hydrogen overvoltage is considered to be due to the higher electrode catalyst activity of the hydrogen generating reaction of the Ru element in the electronic state showing the peak between 281.4 eV and 282.4 eV than the electrode catalyst activity of the Ru element in the electronic state showing the peak between 280.0 eV and 281.0 eV. In addition, the cause for the increase of the reverse current resistance is considered to be the larger electric quantity required for the oxidation of ruthenium when the reverse current flows, due to the more reduced state of the Ru element in the electronic state showing the peak between 281.4 eV and 282.4 eV than the Ru element in the electronic state showing the peak between 280.0 eV and 281.0 eV. Thus, it is considered that the resistance is increased against the reverse current.

In general, the hydrogen generation reaction due to the electrolytic reduction of water is considered to proceed by the combination of the following reaction formulas (I) to (III):

$H_2O + e^- \rightarrow H. + OH^-$   Reaction formula (I):

$2H. \rightarrow H_2$   Reaction formula (II):

$H. + H_2O + e^- \rightarrow H_2 + OH^-$   Reaction formula (III):

The following two paths are considered: the successive reaction including the reaction represented by the reaction formula (I) and the reaction represented by the reaction formula (II), or the successive reaction including the reaction represented by the reaction formula (I) and the reaction represented by the reaction formula (III). In order to reduce the hydrogen overvoltage, it is necessary to promote the rate-determining reaction. Although it is not clear that the rate-determining step is which of the reaction formulas (I), (II) and (III), it is considered that the Ru element having the electronic state showing the peak between 281.4 eV and 282.4 eV promotes the reaction serving as the rate-limiting step than the Ru element having the electronic state showing the peak between 280.0 eV and 281.0 eV, and thus, the hydrogen overvoltage is decreased. When the first intensity ratio is 0.45 or more, ruthenium hydroxide is shown to be formed on the catalyst surface in a larger amount, and the ruthenium hydroxide is considered to largely contribute to the catalytic activity. It is inferred that consequently, the addition of the second component and the third component allows ruthenium hydroxide to be stably formed on the catalyst surface, and a peculiar catalyst layer exhibiting a low hydrogen overvoltage is formed.

From the above-described viewpoint, in the present embodiment, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in the X-ray photoelectron spectroscopic measurement is 0.45 or more, preferably 0.6 or more and more preferably 0.8 or more. The upper limit of the ratio of the maximum intensity of the Ru 3d 5/2 peak is preferably 5 or less, more preferably 4 or less and furthermore preferably 3 or less. The maximum intensity of each of the Ru 3d 5/2 peaks in the X-ray photoelectron spectroscopic measurement can be measured by the same method as in below-described Examples.

It has also been discovered that the hydrogen overvoltage is low and the reverse current resistance is increased in the cathode having a catalyst layer including Ru oxide showing a smaller value of the peak intensity of ruthenium oxide of the Miller index (101) as compared with the peak intensity of ruthenium oxide of the Miller index (110) in an X-ray diffraction measurement. Here, with reference to JCPDS Card No. 431027, the diffraction line of the Miller index (110) is observed at 28° and the diffraction line of the Miller index (101) is observed at 35°. Even with the same ruthenium oxide crystal, different crystal orientations are considered to affect the hydrogen adsorption state, the hydrogen adsorption amount and the like of the surface of the ruthenium oxide crystal; thus, the crystal orientation is considered to be involved in the decrease of the hydrogen overvoltage and the improvement of the reverse current resistance.

From the above-described viewpoint, in the present embodiment, the ratio (hereinafter, the ratio concerned is sometimes referred to as the "second intensity ratio") of the peak intensity of ruthenium oxide of the Miller index (101) plane observed in the angle domain of 2θ=35° to the peak intensity of Ru oxide of the Miller index (110) plane observed in the angle domain of 2θ=28° in the X-ray diffraction measurement is preferably 1.5 or less, more preferably 1.48 or less and furthermore preferably 1.30 or less. In addition, the lower limit of the second intensity ratio is preferably 0.40 or more, more preferably 0.50 or more and furthermore preferably 0.60 or more. Here, "the ratio of the peak intensity of ruthenium oxide of the Miller index (101) plane observed in the angle domain of 2θ=35° to the peak intensity of Ru oxide of the Miller index (110) plane observed in the angle domain of 2θ=28°" means the ratio calculated from [peak intensity (count) of Miller index (101) plane in angle domain of 35° ]/[peak intensity (count) of Miller index (110) plane in angle domain of 28° ].

The ratio (second intensity ratio) between the respective peak intensities can be measured by the same method as in below-described Examples.

From the above-described viewpoint, the cathode for electrolysis in the embodiments of the present invention includes a conductive substrate and a Ru element-containing catalyst layer on the conductive substrate, wherein in the catalyst layer, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in the X-ray photoelectron spectroscopic measurement is 0.45 or more.

In addition, in the catalyst layers in other embodiments of the present invention, the ratio of the peak intensity of Ru oxide of the Miller index (101) plane observed in the angle domain of 2θ=35° to the peak intensity of Ru oxide of the Miller index (110) plane observed in the angle domain of 2θ=28° in the X-ray diffraction measurement can be made to be 1.5 or less.

These cathodes for electrolysis each have a low hydrogen overvoltage and a resistance against the reverse current at the time of the cessation of electrolysis; thus, the consumption of the catalyst layer during electrolysis is small and these cathodes for electrolysis can be used over a long term. In addition, these cathodes for electrolysis can be suitably used as electrodes for electrolysis in, for example, zero gap electrolytic cells.

Examples of the materials usable as the conductive substrate include, without being particularly limited to: nickel, nickel alloy and stainless steel. However, a nickel(Ni)-containing substrate is preferable as the conductive substrate, in consideration of the fact that iron and chromium are eluted when stainless steel is used in a high-concentration alkali aqueous solution, and the electrical conductivity of stainless steel is approximately 1/10 the electrical conductivity of nickel.

The shape of the conductive substrate is not particularly limited, and appropriate shapes can be selected according to the intended purposes. Examples of the usable conductive substrates include, without particularly limited to: porous plates, expanded shapes and woven meshes prepared by weaving nickel wires. For the shape of the conductive substrate, there are suitable specifications according to the distance between the anode and the cathode in an electrolytic cell. Examples of the usable shape of the substrate include, without particularly limited to: porous plates and expanded shapes in case of the anode and the cathode having the finite distance between themselves; and woven meshes prepared by weaving thin wires in the case of so-called zero-gap electrolytic cells with ion-exchange membranes and electrodes brought into contact with each other.

In the conductive substrate of the present embodiment, it is preferable to relax the residual stress during processing, by annealing the conductive substrate in an oxidizing atmosphere. Preferably, on the surface of the conductive substrate, for the purpose of improving the adhesion with the catalyst layer coated on the surface, asperities are formed with a steel grid, an alumina powder or the like, and the surface area is increased by acid treatment.

The catalyst layer provided on the conductive substrate includes the Ru element. The Ru element may be present as a ruthenium compound in the catalyst layer; examples of the usable ruthenium compound include ruthenium oxide and ruthenium hydroxide. The catalyst layer can be formed, for example, by applying a Ru element-containing application liquid onto the conductive substrate, and subsequently, if necessary, by drying or thermally decomposing the applied application liquid. As described above, the ruthenium element in the application liquid can be included as a ruthenium compound in the application liquid.

The ruthenium compound usable as a component of the application liquid for forming a catalyst layer may be, for example, any form of a nitric acid salt, a dinitrodiammine complex, a nitrosyl nitrate, a chloride salt, and an acetic acid salt; for example, from the viewpoint of the easiness in thermal decomposition, a nitric acid salt can be suitably used. The metal concentration of the ruthenium compound is not particularly limited, but is preferably within a range from 10 g/L to 200 g/L and more preferably within a range from 50 g/L to 120 g/L, from the viewpoint of the application thickness of the coating layer per one run of application.

The catalyst layer may also include other components in addition to the Ru element, and thus, may include, for example, a rare earth compound or a compound including another element (a third element). The rare earth compound and the third element included in the catalyst layer may be in any form of a nitric acid salt, a chloride salt and an acetic acid salt; for example, from the viewpoint of the easiness in thermal decomposition, a nitric acid salt can be suitably used. When the sulfur element (S) is used, a sulfur element-containing compound, such as a sulfuric acid salt such as sodium sulfate, a sulfide such as ammonium sulfide, or a sulfur-containing organic compound such as thiourea can also be used.

The catalyst layer includes, for example, the Ru element as the first component, and further can include, as the second component, at least one or more elements selected from Nd, Pm, Sm, Eu, Gd, Tb and Dy. The catalyst layer can also include, further as the third component, at least one or more elements selected from Mn, Fe, Co, Zn, Ga, S and Pb. In the catalyst layer, the first to third components may melt into each other; for example, in the catalyst layer, the second component and the third component may form, with the first component including the Ru element, a solid solution. Moreover, when the second component and the third component are included in the catalyst layer, these can be present as oxides or hydroxides in the catalyst layer.

In general, during the progress of the hydrogen generation reaction in the electrolysis of sodium chloride, the potential of the cathode is maintained at approximately −1.2 V (vs. Ag|AgCl reference electrode). However, when the electrolysis is ceased and the reverse current flows in the cathode, the potential of the cathode is increased while the oxidation reaction is proceeding on the cathode. On the cathode, various oxidation reactions proceed preferentially in the order of increasing redox potential. For example, when a Ni substrate the surface of which is coated with the Ru element-containing catalyst layer is used, first the oxidation reaction (1) of the hydrogen adsorbed on the cathode proceeds in the vicinity of −1.0 V (vs. Ag|AgCl). Next, the oxidation reaction (2) of the Ni metal (Ni substrate surface) proceeds in the vicinity of −0.9 V (vs. Ag|AgCl). Subsequently, the oxidation elution reaction (3) of the Ru element, a component of the catalyst layer, proceeds in the vicinity of −0.1 V (vs. Ag|AgCl).

In this way, the oxidation elution reaction (3) of the Ru element, a component of the catalyst layer, does not start when the reverse current flows, but starts after the completion of the oxidation reaction (1) and the oxidation reaction (2) of the substances having lower redox potentials. Accordingly, the increase of the specific surface area of the catalyst layer also increases, for example, the oxidation reaction (1) and the oxidation reaction (2) each having a lower redox potential than the Ru element of the catalyst layer, accordingly the potential increase of the cathode is delayed, and consequently the time to the oxidation elution reaction (3) of the Ru element of the catalyst layer can be prolonged.

The oxide(s) of at least one or more elements selected from Nd, Pm, Sm, Eu, Gd, Tb and Dy usable as the above-described second component are considered to have the effect of changing the electronic state of the Ru element and reducing the hydrogen overvoltage, and the effect of improving the resistance against the reverse current through the reduction to hydroxide when the hydrogen generation electrolysis is performed in an aqueous solution of sodium hydroxide and at the same time the form variation into needle crystals, the suppression of the detachment, from the substrate, of the ruthenium compound functioning as the catalyst, and the increase of the surface area. When the second component in the catalyst layer, namely, at least one or more elements selected from Nd, Pm, Sm, Eu, Gd, Tb and Dy are included in an amount of 0.01 mol or more in relation to 1 mol of the ruthenium element, it is easy to hold the ruthenium compound, the physical detachment of the ruthenium compound hardly occurs, the effect of reducing the electrolysis voltage is developed, and a sufficient resistance against the reverse current can be imparted. On the other hand, when the amount of the second component is less than 1 mol, because in the coating layer formed by thermal decomposition, oxides having no catalytic activity do not completely cover the surface of the ruthenium compound, a cathode having a low electrolysis voltage is obtained.

In the liquid mixture (application liquid) for forming such a catalyst layer, from the viewpoint of obtaining a more sufficient effect in the catalyst layer (coating layer) formed by the thermal decomposition of the components included in the application liquid concerned, namely, from the viewpoint of decreasing the hydrogen overvoltage and suppressing the consumption of ruthenium, the amount of at least one or more elements (second component) selected from Nd, Pm, Sm, Eu, Gd, Tb and Dy in the application liquid is preferably 0.01 mol or more and less than 1 mol, more preferably 0.02 mol or more and less than 1 mol and furthermore preferably 0.05 mol or more and 0.5 mol or less in relation to 1 mol of the ruthenium element. The content of the second component is yet furthermore preferably 0.05 mol or more and 0.25 mol or less in relation to 1 mol of the ruthenium element.

From the viewpoint of decreasing the hydrogen overvoltage and suppressing the consumption of ruthenium, the content of at least one or more elements (second component) selected from Nd, Pm, Sm, Eu, Gd, Tb and Dy in the catalyst layer is preferably 0.01 mol or more and less than 1 mol and more preferably within a range of 0.02 mol or more and less than 1 mol in relation to 1 mol of the ruthenium element. Furthermore preferably, the content of the second component is 0.05 mol or more and 0.5 mol or less in relation to 1 mol of the ruthenium element. Yet furthermore preferably, the content of the second component is 0.05 mol or more and 0.25 mol or less in relation to 1 mol of the ruthenium element.

When the content of at least one or more elements (third component), usable as the third component, selected from Mn, Fe, Co, Zn, Ga, S and Pb in the catalyst layer is 0.01 mol or more in relation to 1 mol of the ruthenium element, the effect of reducing the electrolysis voltage is obtained by changing the electronic state of ruthenium, and a sufficient resistance against the reverse current is obtained by increasing the surface area. On the other hand, when the content of the third component is less than 1 mol, the oxide(s) of at least one or more elements selected from Mn, Fe, Co, Zn, Ga, S and Pb do not coat the surface of the ruthenium compound, and thus a cathode having a low electrolysis voltage is obtained.

In the liquid mixture (application liquid) for forming such a catalyst layer, from the viewpoint of obtaining a more sufficient effect in the catalyst layer (coating layer) formed by the thermal decomposition of the components included in the application liquid concerned, namely, from the viewpoint of decreasing the hydrogen overvoltage and suppressing the consumption of ruthenium, the content of at least one or more elements (third component) selected from Mn, Fe, Co, Zn, Ga, S and Pb in the application liquid is preferably within a range of 0.01 mol or more and less than 1 mol, more preferably within a range of 0.02 mol or more and less than 1 mol, furthermore preferably within a range of 0.05 mol or more and 0.5 mol or less and yet furthermore preferably within a range of 0.05 mol or more and 0.25 mol or less, in relation to 1 mol of the ruthenium element.

From the viewpoint of decreasing the hydrogen overvoltage and suppressing the consumption of ruthenium, the content of at least one or more elements (third component) selected from Mn, Fe, Co, Zn, Ga, S and Pb in the catalyst layer is preferably 0.01 mol or more and less than 1 mol, more preferably within a range of 0.02 mol or more and less than 1 mol and furthermore preferably within a range of 0.05 mol or more and 0.5 mol or less in relation to 1 mol of the ruthenium element. The content of the third component is yet furthermore preferably 0.05 mol or more and 0.25 mol or less in relation to 1 mol of the ruthenium element.

The oxides of Nd, Pm, Sm, Eu, Gd, Tb and Dy capable of being added as the second component, and Mn, Fe, Co, Zn, Ga, S and Pb capable of being added as the third component can all form oxides each having a valence smaller than four. Accordingly, when the above-described second and third components are used together with the Ru element in the catalyst layer, because the oxides of the foregoing elements are present around the Ru element, the Ru element present in the interface with the added elements is inhibited to form the perfectly tetravalent oxides, and thus the valence of the Ru element as a catalyst component is considered to be partially varied. According to the cathode for electrolysis of the present embodiment, it is considered that there is a possibility that as a result of the reaction of the rate-determining step promoted herewith by the Ru element, the hydrogen overvoltage is decreased.

In the present embodiment, the cathode for electrolysis can be produced by the method for producing an electrode for electrolysis, wherein a catalyst layer is formed on a conductive substrate through: an application step of applying, onto the conductive substrate, an application liquid including as a first component the Ru element, as a second component at least one or more elements selected from Nd, Pm, Sm, Eu, Gd, Tb and Dy, and as a third component at least one or more elements selected from Mn, Fe, Co, Zn, Ga, S and Pb; if necessary, a film formation step of forming a coating film by drying the application liquid; and a thermal decomposition step of heating and thermally decomposing the coating film.

The application step is a step of applying the application liquid including at least the Ru element onto the conductive substrate. Examples of the application liquid include a mixture including the Ru element, at least one or more elements selected from Nd, Pm, Sm, Eu, Gd, Tb and Dy as the second component, and at least one or more elements selected from Mn, Fe, Co, Zn, Ga, S and Pb as the third component. The combination of the first to third components in the application liquid is not particularly limited, but can be a combination in which the first component included in the application liquid is at least one selected from a nitric acid salt, a dinitrodiammine complex, a nitrosyl nitrate, a chloride salt and an acetic acid salt, the second component included in the application liquid is at least one selected from a nitric acid salt, a chloride salt and an acetic acid salt, and the third component included in the application liquid is at least one selected from a nitric acid salt, a chloride salt and an acetic acid salt.

As the method for applying the application liquid for forming the catalyst layer such as a liquid mixture including the Ru element, at least one or more elements selected from Nd, Pm, Sm, Eu, Gd, Tb and Dy as the second component, and at least one or more elements selected from Mn, Fe, Co, Zn, Ga, S and Pb as the third component onto a conductive substrate, for example, the following methods can be suitably used: a dip method in which the conductive substrate is dipped in the application liquid; a method of applying the application liquid with a brush, a roll method in which the application liquid is applied by impregnating a sponge-like roll with the application liquid, and an electrostatic application method in which the application liquid and the conductive substrate are charged with opposite charges and spraying is performed by using a spray or the like. Among these application methods, the roll method and the electrostatic application method can be suitably used from the viewpoint of the productivity and the possibility of the uniform application of the application liquid to the electrode surface.

The film formation step is the step of forming a coating film by drying the application liquid. The drying temperature in the drying of the application liquid in the film formation step is not particularly limited, but is, for example, preferably 100° C. or lower and more preferably approximately 30 to 100° C. In addition, the drying time is not particularly limited, but can be set to be, for example, 5 to 60 minutes.

As described above, in the process of forming the catalyst layer, after the application liquid is applied onto the conductive substrate (after the application step), the applied application liquid is dried at a temperature of approximately 30 to 100° C. for 5 to 60 minutes (the film formation step), and subsequently, preferably the substrate with the dried application liquid is placed in a calcination furnace heated to a temperature of 350° C. or higher and lower than 600° C. and the dried application liquid is thermally decomposed (the thermal decomposition step). The thermal decomposition step is a step of heating and thermally decomposing the coating film formed on the conductive substrate by the film formation step. Here, the "thermal decomposition" means a reaction promoting the decomposition of the included metal salts into the metals and the gaseous substances by heating the coating film. Although depending on the atmosphere, in the oxygen atmosphere, many metals tend to be bonded to oxygen to form oxides.

In the thermal decomposition step, in order to promote the thermal decomposition of the application liquid for forming the catalyst layer, such as a mixture including the Ru element, at least one or more elements selected from Nd, Pm, Sm, Eu, Gd, Tb and Dy as the second component, and at least one or more elements selected from Mn, Fe, Co, Zn, Ga, S and Pb as the third component, the thermal decomposition temperature is preferably within a temperature range of 350° C. or higher and lower than 600° C. At a temperature of 350° C. or higher, the rate of the thermal decomposition of the mixture can be increased; on the other hand, at a temperature of 600° C. or higher, the softening of the nickel substrate rapidly proceeds, and the shape as an electrode is hardly maintained. Accordingly, from the viewpoint of the promotion of the thermal decomposition of the mixture and the maintenance of the strength of the nickel substrate, a temperature range of 350° C. or higher and 550° C. or lower is preferable, and further, from the viewpoint of the hydrogen overvoltage and the consumption of ruthenium, a temperature range of 350° C. or higher and 500° C. or lower is preferable. In order to sufficiently perform the thermal decomposition, a long thermal decomposition time is preferable; however, in order to prevent the complete oxidation of the thermal decomposed product, and in consideration of the aspect of the productivity of the electrode, the thermal decomposition time for one run of thermal decomposition is preferably within a range of 5 to 60 minutes and more preferably within a range of 10 to 30 minutes.

In addition, before the calcination (thermal decomposition) is performed (before the thermal decomposition step), a preliminary calcination may be performed in a temperature range of 100° C. or higher and lower than 350° C. at which the crystal water of each of the components included in the application liquid disappears. The temperature of the preliminary calcination is preferably 120° C. or higher and lower than 350° C. and more preferably from 150° C. to 300° C. The time of the preliminary calcination is preferably 1 minute to 60 minutes, more preferably from 1 minute to 30 minutes and furthermore preferably from 1 minute to 15 minutes.

The predetermined thickness of the coating layer (catalyst layer) is obtained, if necessary, by repeating twice or more the cycle of the application (application step)-drying (film formation step)-thermal decomposition calcination (thermal decomposition step). From the viewpoint of a practical range of repetition times, the number of repetition times is preferably 20 or less. The term capable of maintaining the low overvoltage is prolonged with the increase of the thickness of the coating layer; however, from the viewpoint of the economical efficiency, the coating is performed in such a way that the supported amount of the Ru element in the formed catalyst layer is preferably 1 to 20 $g/m^2$, more preferably 2 to 18 $g/m^2$ and furthermore preferably 3 to 15 $g/m^2$.

In order to form the catalyst layer so as to have a predetermined thickness, the application amount in one time of application may be increased, or alternatively, the metal concentration of the ruthenium compound may be increased. However, when the application amount in one time of application is large, unevenness is liable to be caused during application, and thus the catalyst layer is sometimes not uniformly formed. Accordingly, in the formation of the catalyst layer, it is preferable to perform several times the cycle of application-drying-thermal decomposition calcination. From the above-described viewpoint, the application amount in one time of application of the application liquid on the conductive substrate in the application step is set in such a way that the amount of the Ru element in the formed catalyst layer is preferably approximately 0.1 to 2 $g/m^2$, more preferably 0.2 to 1.8 $g/m^2$ and furthermore preferably 0.5 to 1.6 $g/m^2$.

EXAMPLES

The present embodiment is described in more detail on the basis of Examples, but the present invention is not limited to these Examples. The respective evaluations were performed by the below-described methods.

(X-Ray Photoelectron Spectroscopic Measurement)

An X-ray photoelectron spectroscopic measurement was performed as follows.

A test cathode was cut out to approximately 5 mm×15 mm, and the Ru 3d spectrum was measured by X-ray photoelectron spectroscopy (XPS). In this case, the test cathode was fixed in a sample holder having a recess in the lower portion thereof so as for the test cathode to bridge over the recess in order to avoid the detection of the signal from the sample holder, an X-ray photoelectron spectrometer (ESCALAB250, manufactured by Thermo Fisher Scientific Inc.) was used, and the measurement was performed under the conditions of X-ray source: monochromatized AlKα, X-ray source voltage: 15 kV, X-ray source current: 10 mA, lens mode: Large Area XL mode, Pass energy: 20 eV, and analysis size: 1 mm (elliptical shape). The correction of the peak due to the charging during measurement was performed by adjusting the binding energy of the peak generated by the overlapping of the Ru 3d 3/2 and the C 1s of the surface contaminating hydrocarbon to 284.6 eV. The spectra shown in FIGS. 3 to 6 were normalized in such a way that the maximum intensity of each of the 3d 5/2 peaks appearing between 280.0 and 281.0 eV of below-described Comparative Example 1 was set to be 1.0, and the maximum intensity of each of the 3d 5/2 peaks of the spectra of the other test cathodes appearing between 280.0 and 281.0 eV was the same as the corresponding maximum intensity of below-described Comparative Example 1.

(Measurement of Ru 3d 5/2 Peak Intensity Ratio)

After correction for charging, the background was removed by the Shirley method in the binding energy range from 274 eV to 298 eV, and then the maximum intensity of the Ru 3d 5/2 peak between 280.0 eV and 281.0 eV was compared with the maximum intensity of the Ru 3d 5/2 peak between 281.4 eV and 282.4 eV. The method for subtracting the background by the Shirley method is described in, for example, "X-Ray Photoelectron Spectroscopy in Selected Series of Surface Analysis Techniques, edited by Japanese Society of Surface, pp. 114-115". The calculation formula of the intensity ratio (first intensity ratio) is shown below.

Intensity ratio=[maximum peak intensity (cps) between 281.4 eV and 282.4 eV]/[maximum peak intensity (cps) between 280.0 eV to 281.0 eV]   (Calculation formula)

When the second component and the third component are present around the Ru element, the electronic state of the Ru element is sometimes affected to slightly vary the energy position giving the maximum value. Accordingly, the maximum values of the peak intensity of Ru 3d 5/2 were extracted in the range from 281.4 eV to 282.4 eV and in the range from 280.0 eV to 281.0 eV, and the intensity ratio was calculated by substituting the obtained maximum values into the foregoing calculation formula. The catalyst layer having the intensity ratio of 0.45 or more is qualified as the cathode for electrolysis of the present invention.

(X-Ray Diffraction Measurement of Ruthenium Oxide)

The test cathode was cut out to 30 mm×30 mm, and was fixed to an aluminum sample plate (manufactured by Rigaku Corp.). An X-ray diffractometer (UltraX18, manufactured by Rigaku Corp.) was used. As an X-ray source, CuKα ray (λ=1.54184 Å) was used, and the measurement was performed under the conditions of an acceleration voltage of 50 kV, a current of 200 mA, a scanning axis of 2θ/θ, a step spacing of 0.02°, a scanning speed of 2.0°/min and a measurement range of 2θ=20 to 60°. In FIGS. 7 to 10, the peak intensities of the test cathodes were normalized in such a way that the peak intensity at 28° of each of the test cathodes was the same as the peak intensity at 28° of below-described Comparative Example 1.

(Measurement of Diffraction Peak Intensity Ratio of Ruthenium Oxide)

Next, the peak intensity of the Miller index (110) plane at 28° of ruthenium oxide and the peak intensity of the Miller index (101) plane at 35° of ruthenium oxide were compared with each other, both peak intensities being subjected to the subtraction of the base line. The diffraction line positions of ruthenium oxide were determined with reference to JCPDS Card No. 431027. The calculation formula of the intensity ratio (second intensity ratio) is shown below.

Intensity ratio=peak intensity (count) at 35° of Miller index (101) plane/peak intensity (count) at 28° of Miller index (110) plane   (Calculation formula)

The catalyst layer having the intensity ratio of 1.5 or less is qualified as the cathode for electrolysis of the present invention. When a solid solution of ruthenium oxide with the second element and third element is formed, the position of the diffraction line of ruthenium oxide deviates from the card data value. When a solid solution of ruthenium oxide with the second element and third element is formed, the diffraction line of ruthenium oxide undergoes the appearance of a peak top between the position of the diffraction line of ruthenium oxide and the position of the diffraction line of the oxide of the element forming the solid solution. The peak top is taken as the position of the diffraction line. The magnitude of the deviation is different depending on the solid solution proportion (Vegard's law).

(Reverse Current Application Test)

Figure 2:
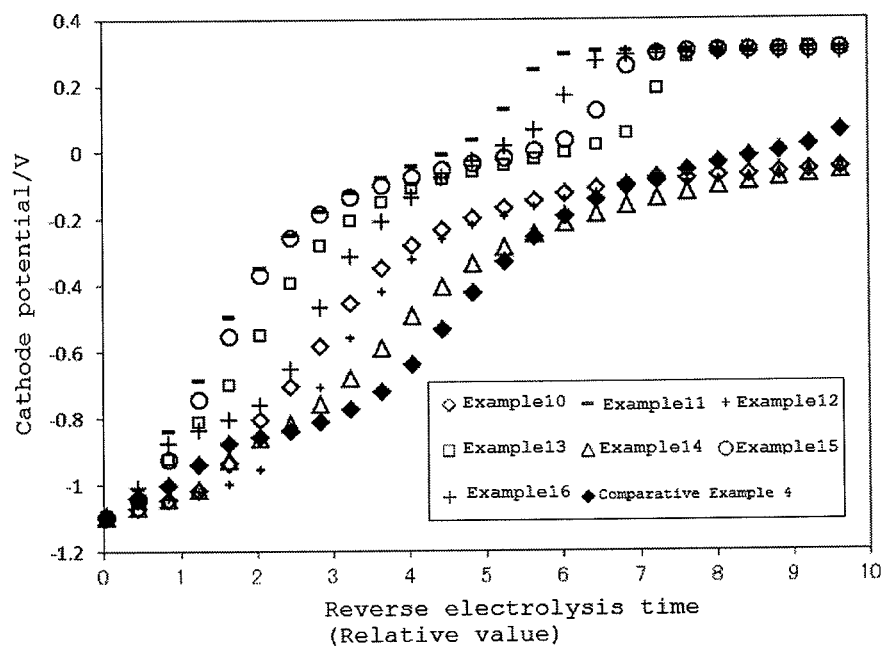
FIG. 2 is a graph showing the cathode potential increase behaviors in the reverse current application tests of the hydrogen generating cathodes obtained in other Examples and another Comparative Example.
Figure 3:
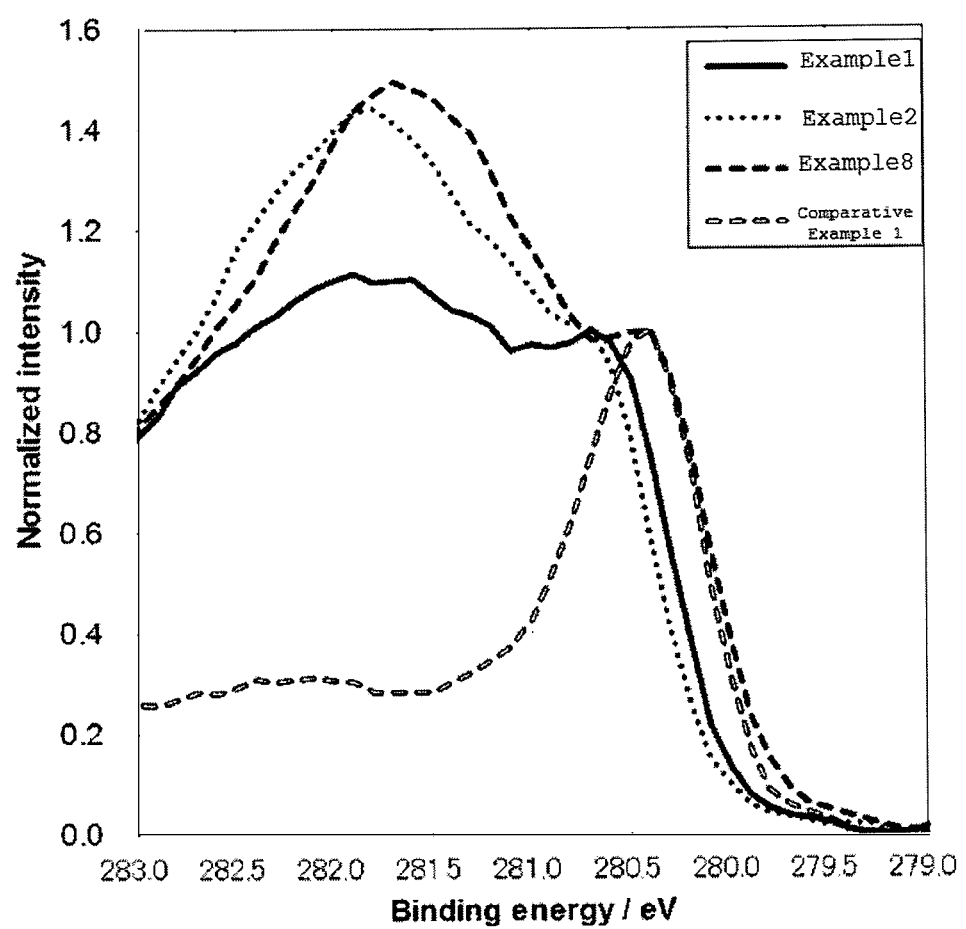
FIG. 3 is a diagram showing the X-ray photoelectron spectroscopic spectra of Examples and Comparative Example 1.
Figure 4:
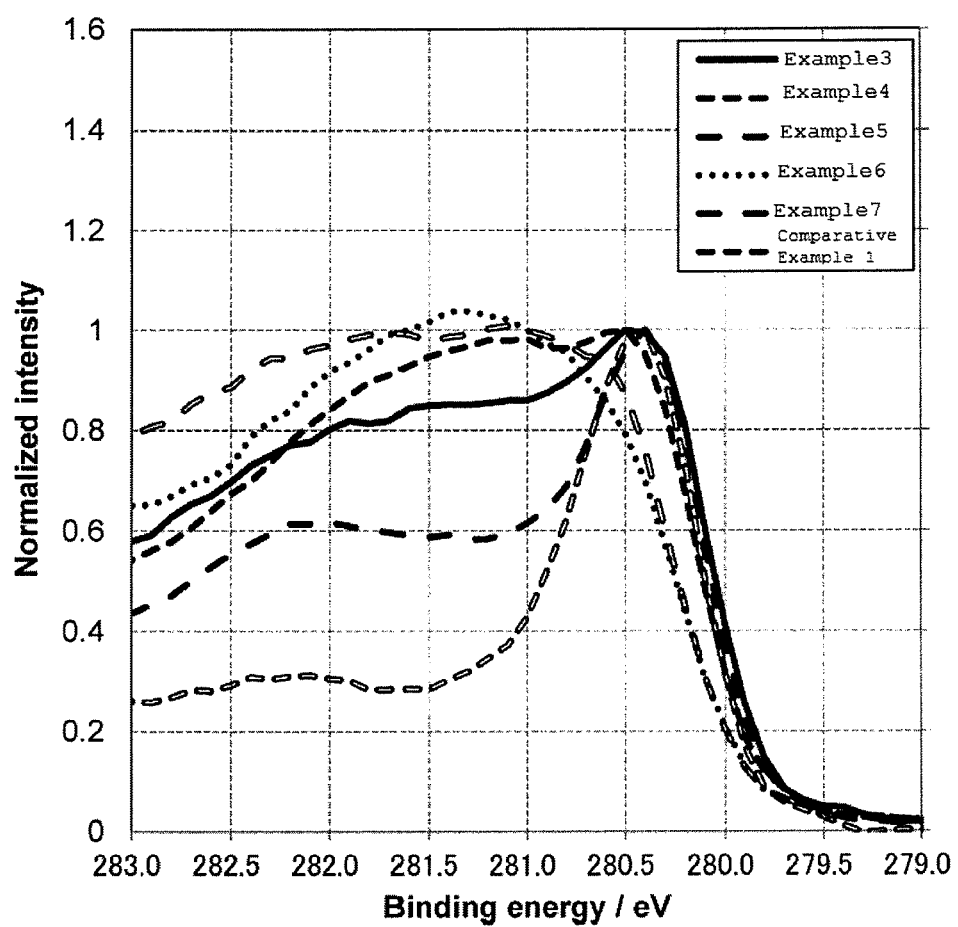
FIG. 4 is a diagram showing the X-ray photoelectron spectroscopic spectra of other Examples and Comparative Example 1.
Figure 5:
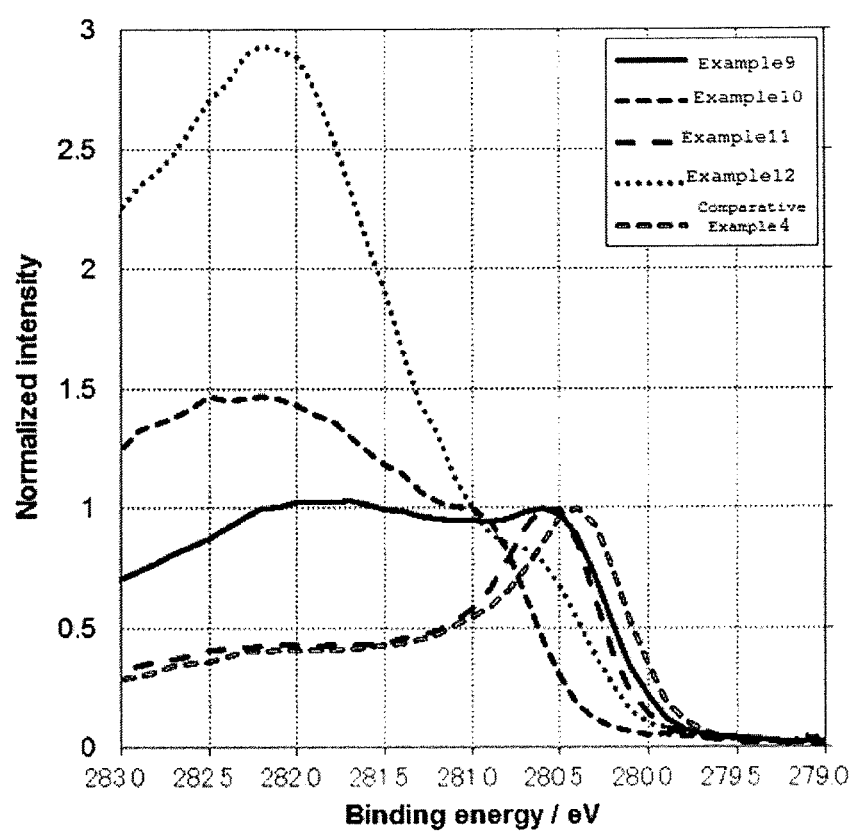
FIG. 5 is a diagram showing the X-ray photoelectron spectroscopic spectra of other Examples and Comparative Example 4.
Figure 6:
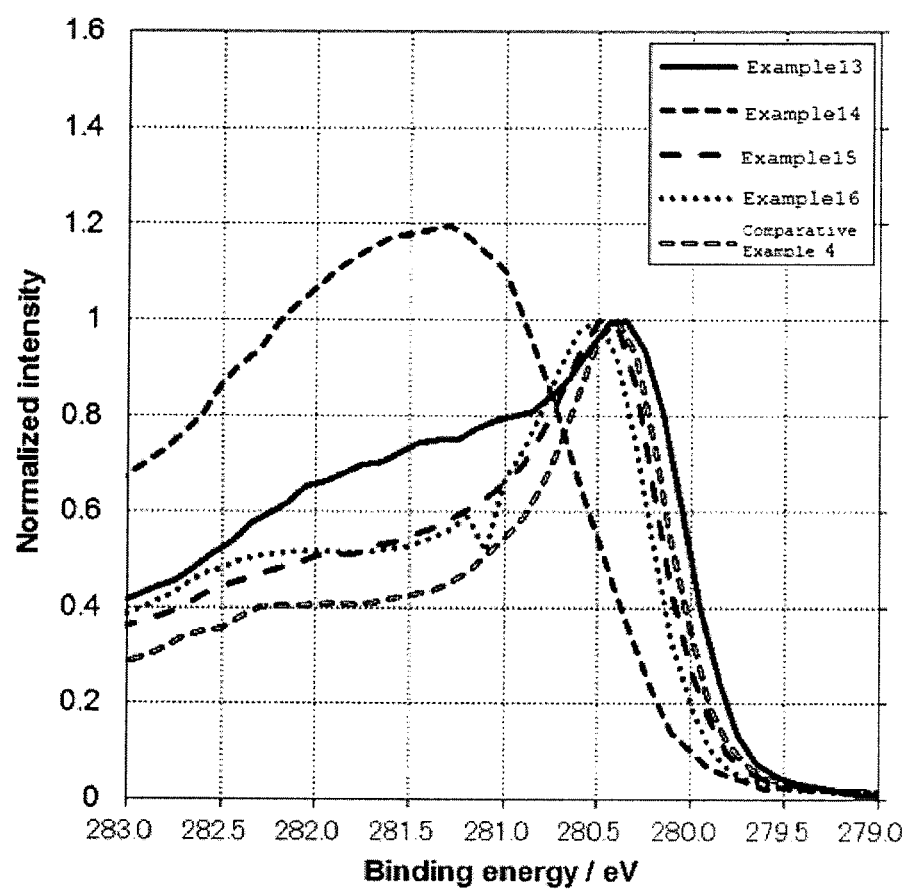
FIG. 6 is a diagram showing the X-ray photoelectron spectroscopic spectra of other Examples and Comparative Example 4.
Figure 7:
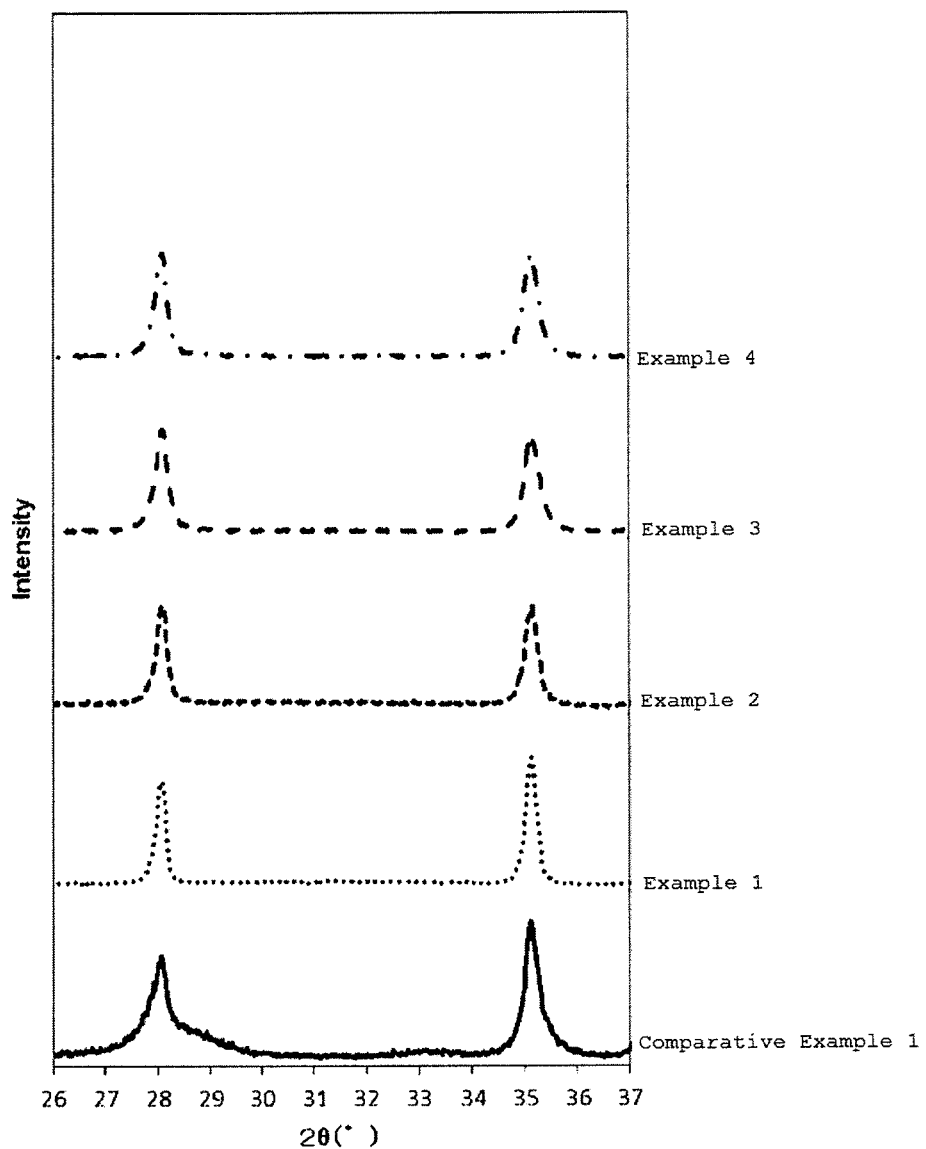
FIG. 7 is a diagram showing the X-ray diffraction patterns of Examples and Comparative Example 1.
Figure 8:
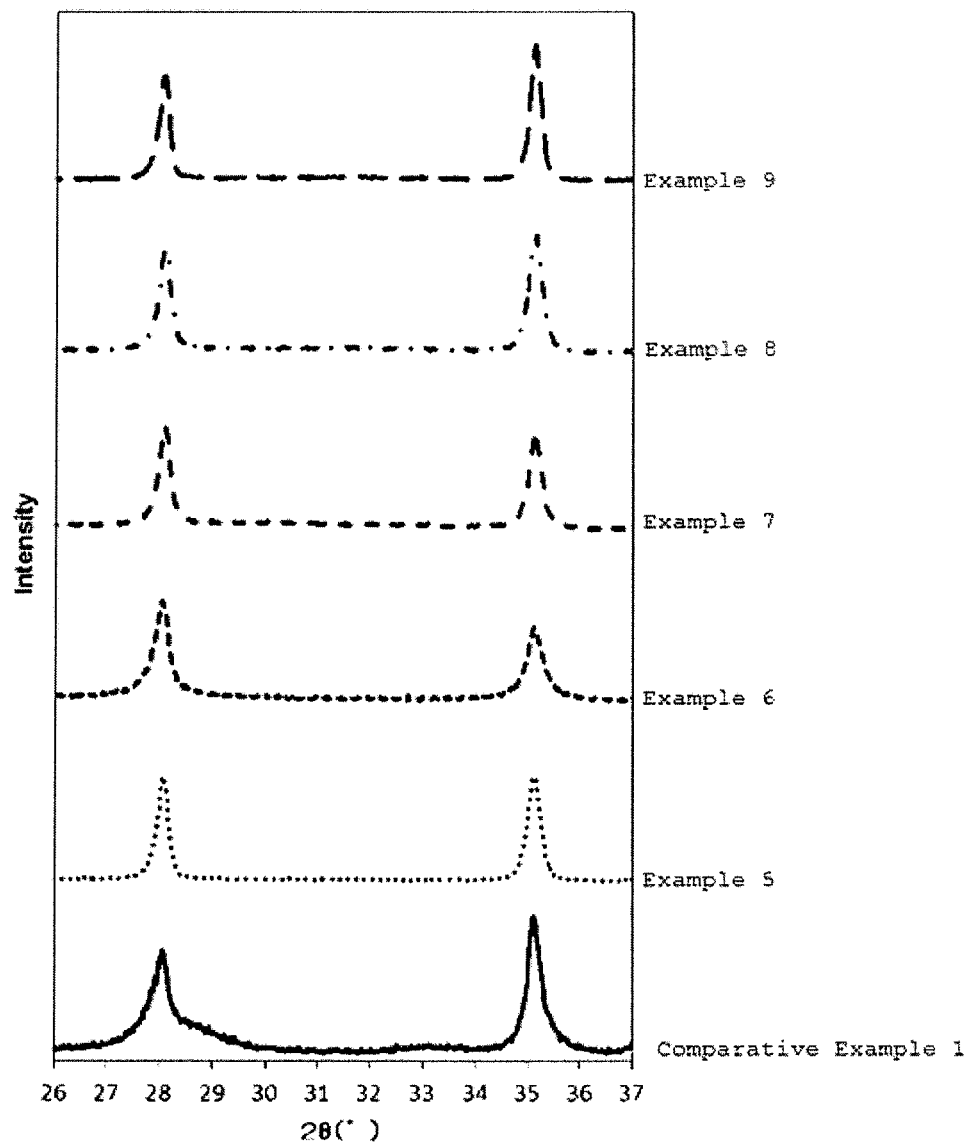
FIG. 8 is a diagram showing the X-ray diffraction patterns of other Examples and Comparative Example 1.
Figure 9:
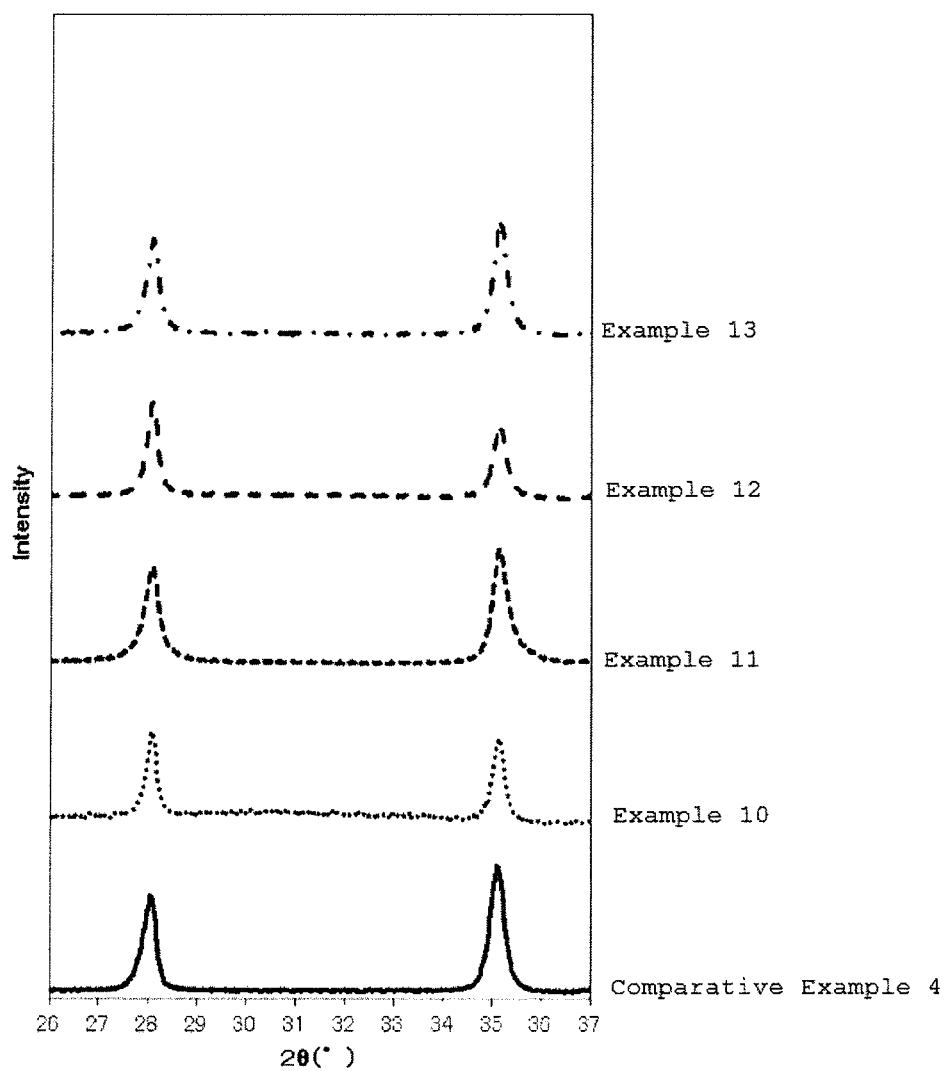
FIG. 9 is a diagram showing the X-ray diffraction patterns of other Examples and Comparative Example 4.
Figure 10:
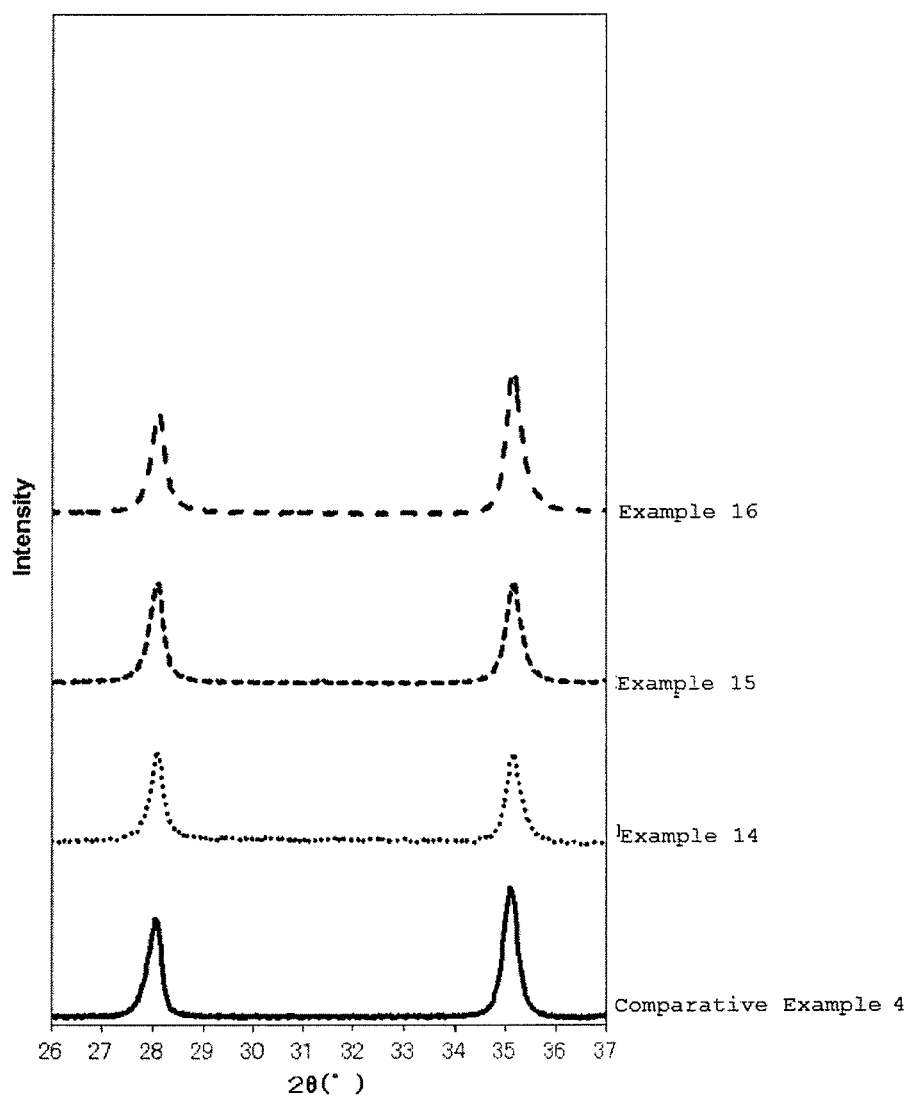
FIG. 10 is a diagram showing the X-ray diffraction patterns of other Examples and Comparative Example 4.

The evaluation of the resistance against the reverse current was performed according to the following procedure. The test cathode was cut out to 30 mm×30 mm, and was fixed to an electrolysis cell with nickel screws. A platinum plate was used as the counter electrode, and an electrolysis was performed at 80° C., in a 32% by mass aqueous sodium hydroxide solution, at an electrolytic current density of 1 kA/m² for 20 minutes, at electrolytic current densities of 2 kA/m² and 3 kA/m², for 3 minutes at each current density, and at 4 kA/m² for 30 minutes, so as for the test cathode to generate hydrogen; then, while the cathode potential was being measured by using Ag/AgCl as reference electrode, the reverse electrolysis was performed at a current density of 0.05 kA/m². FIGS. 1 and 2 show the increase behaviors of the cathode potentials during the reverse electrolysis. The abscissa of each of FIGS. 1 and 2 described the relative values with reference to 1.0 defined for the time in which the cathode of below-described Comparative Example 1 reached the dissolution potential of ruthenium, −0.1 V vs. Ag/AgCl. The reverse current resistance times in Table 1 and Table 2 presented below described the times (relative values) in which the test cathodes each reached the dissolution potential of ruthenium, −0.1 V vs. Ag/AgCl.

(Sodium Chloride Electrolysis Test by Ion-Exchange Membrane Method)

By using a small-size electrolysis cell, a sodium chloride electrolysis test by ion-exchange membrane method was performed, and the electrolysis voltage was measured. In the present test, the anode, a constituent element other than the cathode, the ion-exchange membrane, the electrolysis cell and the like used were the same, and hence the decrease of the electrolysis voltage reflects the decrease of the hydrogen overvoltage. The test cathode was cut out to a size of 95 mm×110 mm, and the four sides were bent in a width of approximately 2 mm. As the current collector, a nickel expand metal was used. The size of the current collector was 95 mm×110 mm. A mat woven with nickel fine wires was placed on the current collector, the test cathode subjected to the bending processing was placed thereon with the bent portions facing the current collector, the four corners of the test cathode were fixed to the current collector with a string made of Teflon (registered trademark). As the anode, used was the so-called DSA in which a solid solution composed of ruthenium oxide, iridium oxide and titanium oxide was formed on the titanium substrate. Electrolysis was performed under the conditions that the ion-exchange membrane was sandwiched with rubber gaskets made of EPDM (ethylene propylene diene), and thus the anode cell and the cathode cell were isolated from each other. As the ion-exchange membrane, "Aciplex" (registered trade mark) F6801 (manufactured by Asahi Kasei Chemicals Corp.) was used. Electrolysis was performed under the conditions that the anode, the ion-exchange membrane and the cathode were in close contact with each other (zero-gap electrolysis).

The residual rate of ruthenium after the sodium chloride electrolysis test by ion-exchange membrane method was verified by fluorescent X-ray analysis. In the analysis concerned, Niton XL3t-8005 manufactured by Thermo Fisher Scientific Inc. was used. The measurement mode was set to be the Precious Metal Mode, and the integration time was set to be 20 seconds. Before and after the test, the measurements were performed at five points in the cathode surface, and the residual rate of ruthenium was calculated from the measurement average value.

The solution concentrations in the anode and cathode tanks were regulated in such a way that the concentration of the brine in the anode chamber was 205 g/L and the sodium hydroxide concentration in the cathode chamber was 32% by mass. In addition, the temperatures in the anode and cathode tanks were regulated in such a way that the temperature in the electrolysis cell was 90° C. The electrolysis current density was set at a constant value of 6 kA/m², and the electrolysis was performed for an optional period of time.

Examples 1 to 16

(Application Step)

As the conductive substrate, used was a woven mesh prepared by weaving nickel fine wires having a diameter of 0.15 mm so as to have a 40 mesh opening. The woven mesh was blasted by using alumina particles of JIS R6001(1998) #320, then acid treated with 6N hydrochloric acid at room temperature for 5 minutes, then washed with water, and dried.

Next, an application liquid was prepared by adding, to a ruthenium nitrate solution (ruthenium concentration: 100 g/L, manufactured by Furuya Metal Co., Ltd.), the nitric acid salt of rare earth, the second component, and the nitric acid salt(s) of at least one or more elements selected from Mn, Fe, Co, Zn, Ga, S and Pb, the third component in such a way that the metals have compositions described in Table 1 presented below. It is to be noted that with respect to S (sulfur element), thiourea was used.

A vat containing the application liquid was disposed in the lowermost part of an application roll, the application roll made of EPDM was impregnated with the application liquid, and the application roll was disposed in the upper part of the vat in such a way that the roll and the application liquid were always brought into contact with each other. Further, above the application roll, a roller made of PVC (polyvinyl chloride) was disposed, and the application liquid was applied onto the conductive substrate (roll method).

(Film Formation Step)

Subsequently, the application liquid applied onto the conductive substrate was dried at 50° C. for 10 minutes to form a coating film. After the coating film was formed, the coating film was preliminarily calcined in the atmosphere at 150° C. for 3 minutes by using a muffle furnace (product name: KM-600, manufactured by Advantec Co., Ltd.).

(Thermal Decomposition Step)

Successively, the preliminarily calcined coating film was heated and calcined at the calcination temperature described in Table 1 for 10 minutes to thermally decompose the coating film.

The cycle of the above-described application (application step), drying (film formation step) and thermal decomposition (thermal decomposition step) was repeated until the weight of Ru fell within a range of 8±2 g/m² to prepare a cathode for electrolysis. The application amount of the Ru element in the catalyst layer was calculated from the mass ratios of the oxides of the individual added elements on the basis of the assumption that the oxides were formed while the individual added elements were still maintaining the proportions in the application liquid. However, it was assumed that S was not oxidized and S was present intact in the catalyst layer.

According to the above-described methods, the sodium chloride electrolysis test by ion-exchange membrane method, the reverse current application test, the X-ray photoelectron spectroscopic measurement and the X-ray diffraction measurement were performed. For each of Examples 1 to 16, Table 1 presented below shows the electrolysis voltage after 7 days from the sodium chloride electrolysis test by ion-exchange membrane method and the residual rate of ruthenium after the test, the reaching time to the dissolution potential of Ru in the reverse current application test (reverse current resistance time), the Ru 3d 5/2 peak intensity ratio (first intensity ratio) in the X-ray photoelectron spectroscopic measurement, and the diffraction line intensity ratio (second intensity ratio) of ruthenium oxide calculated in the X-ray diffraction measurement.

Comparative Example 1

As the conductive substrate, used was a woven mesh prepared by weaving nickel fine wires having a diameter of 0.15 mm so as to have a 40 mesh opening. The woven mesh was blasted by using alumina particles of JIS R6001(1998) #320, then acid treated with 6N hydrochloric acid at room temperature for 5 minutes, then washed with water, and dried.

Except for the conductive substrate, a cathode for electrolysis was prepared according to the method of Example 1 described in Japanese Patent Laid-Open No. 2006-299395, p. 9, lines 14 to 29 (from the fourth line of the paragraph 0035 to the paragraph 0036). Specifically, to an aqueous ruthenium chloride solution having a metal concentration of 100 g/L, cerium chloride and niobium chloride were added in such a way that the respective metals satisfied the molar ratio of Ru:Ce:Nb=1:¼:¹⁄₁₆. The resulting mixture was stirred at 90° C. for twenty-four hours to prepare a mixed aqueous solution. The resulting mixed aqueous solution was used as it was as an application liquid.

A vat containing the application liquid was disposed in the lowermost part of an application roll, the application roll made of EPDM was impregnated with the application liquid, and a roll was disposed in the upper part of the vat in such a way that the roll was always brought into contact with application liquid. Further, above the application roll, a roller made of PVC was disposed, and the application liquid was applied onto an expanded substrate made of nickel.

Before drying, the substrate on which the catalyst solution was applied was made quickly pass between two sponge rolls made of EPDM to remove the excessive catalyst solution. Subsequently, the coated substrate was dried at 50° C. for 10 minutes, then calcined in the atmosphere at 500° C. for 10 minutes; thus, the cycle of the roll application, drying and calcination at 500° C. was repeated 10 times in total; and finally the coated substrate was calcined at 550° C. for 1 hour.

For Comparative Example 1, Table 2 presented below shows the electrolysis voltage after 7 days from the sodium chloride electrolysis test by ion-exchange membrane method and the residual rate of ruthenium after the test, the reaching time to the dissolution potential of Ru in the reverse current application test (reverse current resistance time), the Ru 3d 5/2 peak intensity ratio (first intensity ratio) in the X-ray photoelectron spectroscopic measurement, and the diffraction line intensity ratio (second intensity ratio) of ruthenium oxide calculated in the X-ray diffraction measurement. In each of Examples 1 to 16, the reverse current resistance time was 3.0 or more when the reverse current resistance time of Comparative Example 1 was set to be 1.0, accordingly in each of Examples 1 to 16, the time until the dissolution of Ru during the reverse current generation was prolonged, and the reverse current resistance was improved. In addition, in each of Examples 1 to 16, the electrolysis voltage in the sodium chloride electrolysis test by ion-exchange membrane method was shown to be lower than the corresponding electrolysis voltage in Comparative Example 1, and thus, the effect of the voltage reduction was manifested. Moreover, in the X-ray diffraction measurement of Comparative Example 1, the intensity ratio (the second intensity ratio) between the peak of the Miller index (110) at 28° and the peak of the Miller index (101) at 35° of ruthenium oxide was 1.69; in contrast to this, in all of Examples 1 to 16, the corresponding intensity ratio fell within a range of 1.5 or less. In the X-ray diffraction of Comparative Example 1, the diffraction line of cerium oxide overlapped the higher degree side of the peak of the Miller index (110) at 28°, and hence, a separation of the peaks was performed.

Comparative Example 2

As the conductive substrate, used was a woven mesh prepared by weaving nickel fine wires having a diameter of 0.15 mm so as to have a 40 mesh opening. The woven mesh was blasted by using alumina particles of JIS R6001(1998) #320, then acid treated with 6N hydrochloric acid at room temperature for 5 minutes, then washed with water, and dried.

Except for the conductive substrate, a cathode for electrolysis was prepared according to the method of Example 1 described in Japanese Patent Laid-Open No. 2000-239882, p. 4, line 43 in the left column to line 10 in the right column (paragraph 0014). Specifically, cerium nitrate and dinitrodiammine platinum salt (molar ratio: 1:1) were dissolved in 8% by weight nitric acid, a solvent, to prepare an application liquid having a total concentration of 5% by weight. The resulting application liquid was applied onto both surfaces of the nickel mesh by using a brush, the substrate thus treated was dried at 60° C., and then calcined in an electric furnace at 500° C. for 20 minutes. This set of operations was repeated three times, to prepare an activated cathode having a final catalyst coating amount of 4 g/m².

Table 2 shows the electrolysis voltage, in Comparative Example 2, after 7 days from the sodium chloride electrolysis test by ion-exchange membrane method.

Comparative Example 3

As the conductive substrate, used was a woven mesh prepared by weaving nickel fine wires having a diameter of 0.15 mm so as to have a 40 mesh opening. The woven mesh was blasted by using alumina particles of JIS R6001(1998) #320, then acid treated with 6N hydrochloric acid at room temperature for 5 minutes, then washed with water, and dried.

Except for the conductive substrate, a cathode for electrolysis was prepared according to the method of Example 3 described in Japanese Patent Laid-Open No. 2008-240001, p. 8, lines 39 to 44 (paragraph No. [0039]). Specifically, in a chloroplatinic acid-containing 2% hydrochloric acid aqueous solution, a nickel plate was immersed and taken out after 5 minutes and dried at 60° C., and then calcined in an electric furnace at 500° C. for 10 minutes. This set of operations was repeated three times, to prepare a catalyst layer (a mesh with a catalyst formed thereon) having a Pt coating film having a final total catalyst amount of 3 g/m². A cerium nitrate solution (concentration: 5% by weight) was prepared, the mesh with the catalyst formed thereon was immersed in the resulting solution and then slowly pulled out from the solution, and the pulled out mesh was dried at 60° C., and then calcined in an electric furnace at 500° C. for 10 minutes. This set of operations was repeated two times, to prepare a hydrogen generating cathode having a final $CeO_2$ catalyst amount of 0.5 g/m².

Table 2 shows the electrolysis voltage, in Comparative Example 3, after 7 days from the sodium chloride electrolysis test by ion-exchange membrane method.

Comparative Example 4

A cathode for electrolysis was prepared according to the composition of Table 2 by the same method as in Examples 1 to 16 except that Ti was adopted as the element of the third component.

For Comparative Example 4, Table 2 presented below shows the electrolysis voltage after 7 days from the sodium chloride electrolysis test by ion-exchange membrane method and the residual rate of ruthenium after the test, the reaching time to the dissolution potential of Ru in the reverse current application test (reverse current resistance time), the Ru 3d 5/2 peak intensity ratio (first intensity ratio) in the X-ray photoelectron spectroscopic measurement, and the diffraction line intensity ratio (second intensity ratio) of ruthenium oxide calculated in the X-ray diffraction measurement.

In Examples 1 to 16, the ratio (first intensity ratio) of the maximum intensity of the Ru 3d 5/2 peak between 281.4 to 282.4 eV to the maximum intensity of the Ru 3d 5/2 peak between 280.0 to 281.0 eV was found to be 0.46 or more, whereas the maximum intensity ratio of the Ru 3d 5/2 peak of Comparative Example 1 was found to be 0.41.

TABLE 1

| | Composition and molar ratio | Calcination temperature/° C. | Electrolysis voltage (V) | Residual rate of ruthenium | Reverse current resistance time (vs. Comparative Example 1) | Ru 3 d intensity ratio (first intensity ratio) | Intensity ratio of Ru oxide (second intensity ratio) |
|---|---|---|---|---|---|---|---|
| Example 1 | Ru:Nd:Zn = 1:0.25:0.25 | 400 | 2.94 | 99% or more | 5.8 | 1.12 | 1.15 |
| Example 2 | Ru:Nd:Fe = 1:0.25:0.25 | 400 | 2.93 | 99% or more | 8.3 | 1.44 | 1.00 |
| Example 3 | Ru:Nd:Co = 1:0.25:0.25 | 400 | 2.94 | 99% or more | 5.8 | 0.85 | 0.97 |
| Example 4 | Ru:Nd:Mn = 1:0.25:0.25 | 400 | 2.93 | 99% or more | 4.0 | 0.96 | 1.03 |
| Example 5 | Ru:Nd:Ga = 1:0.25:0.25 | 400 | 2.94 | 99% or more | 3.1 | 0.62 | 1.04 |
| Example 6 | Ru:Nd:S = 1:0.25:0.25 | 400 | 2.94 | 99% or more | 8.3 | 1.00 | 0.76 |
| Example 7 | Ru:Nd:Pb = 1:0.25:0.25 | 400 | 2.94 | 99% or more | 5.4 | 1.00 | 0.98 |

TABLE 1-continued

|  | Composition and molar ratio | Calcination temperature/° C. | Electrolysis voltage (V) | Residual rate of ruthenium | Reverse current resistance time (vs. Comparative Example 1) | Ru 3 d intensity ratio (first intensity ratio) | Intensity ratio of Ru oxide (second intensity ratio) |
|---|---|---|---|---|---|---|---|
| Example 8 | Ru:Sm:Fe = 1:0.25:0.25 | 400 | 2.94 | 99% or more | 6.5 | 1.49 | 1.05 |
| Example 9 | Ru:Sm:Zn = 1:0.25:0.25 | 400 | 2.94 | 99% or more | 3.8 | 1.00 | 1.35 |
| Example 10 | Ru:Sm:Co = 1:0.5:0.1 | 400 | 2.94 | 99% or more | 6.7 | 1.47 | 1.00 |
| Example 11 | Ru:Sm:Mn = 1:0.1:0.5 | 500 | 2.94 | 99% or more | 3.4 | 0.46 | 1.23 |
| Example 12 | Ru:Eu:Zn = 1:0.5:0.25 | 500 | 2.94 | 99% or more | 7.2 | 2.93 | 0.81 |
| Example 13 | Ru:Nd:Fe = 1:0.25:0.25 | 350 | 2.94 | 99% or more | 4.2 | 0.75 | 1.30 |
| Example 14 | Ru:Nd:Co = 1:0.25:0.25 | 350 | 2.94 | 99% or more | 8.1 | 1.20 | 1.00 |
| Example 15 | Ru:Nd:Mn = 1:0.25:0.25 | 350 | 2.94 | 99% or more | 3.6 | 0.56 | 1.00 |
| Example 16 | Ru:Dy:Co = 1:0.1:0.25 | 450 | 2.91 | 99% or more | 4.3 | 0.54 | 1.48 |

TABLE 2

|  | Composition and molar ratio | Electrolysis voltage (V) | Residual rate of ruthenium | Reverse current resistance time (vs. Comparative Example 1) | Ru 3 d intensity ratio (first intensity ratio) | Intensity ratio of Ru oxide (second intensity ratio) |
|---|---|---|---|---|---|---|
| Comparative Example 1 | Ru:Ce:Nb = 1:0.25:0.0625 | 2.96 | 90% | 1.0 | 0.32 | 1.69 |
| Comparative Example 2 | Pt:Ce = 1:1 | 3.00 | — | — | — | — |
| Comparative Example 3 | Pt (over coating of Ce) | 3.16 | — | — | — | — |
| Comparative Example 4 | Ru:Nd:Ti = 1:0.1:0.25 | 2.96 | 97% | 6.9 | 0.41 | 1.34 |

Example 17

A cathode for electrolysis was prepared by the same method as in Example 9 except for the molar ratio of the composition, namely, with the molar ratio of Ru:Sm:Zn=1: 0.25:1 wherein the addition amount of the third component element was set to be 1. When the cathode for electrolysis of Example 17 was electrolyzed at a current density of 6 kA/m$^2$ for 7 days, the amount of ruthenium included in the catalyst layer was found to be decreased to 94% as compared with the initial value. It is to be noted that when the cathode for electrolysis of each of Examples 1 to 16 was electrolyzed under the same conditions as described above, 99% or more of ruthenium was found to remain.

The disclosure of Japanese Patent Application No. 2014-264303 filed on Dec. 26, 2014 is wholly incorporated in the present description by reference.

All the documents, patent applications, and technical specifications described in the description are incorporated in the present description by reference, to the same extent as in the case where individual documents, patent applications, and technical specifications are described specifically and individually to be incorporated by reference.

INDUSTRIAL APPLICABILITY

The cathode for electrolysis of the present invention is used for the electrolysis of water or an aqueous alkali metal compound solution, and is particularly suitable as a hydrogen generating cathode.

The invention claimed is:

1. A cathode for electrolysis comprising a conductive substrate and a Ru element-containing catalyst layer on the conductive substrate, wherein the catalyst layer comprises, as a second component, at least one or more elements selected from Nd, Pm, Sm, Eu, Gd, Tb and Dy and, as a third component, at least one or more elements selected from Mn, Fe, Co, Zn, Ga, S and Pb, wherein in the catalyst layer, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in an X-ray photoelectron spectroscopic measurement is 0.45 or more.

2. The cathode for electrolysis according to claim 1, wherein in the catalyst layer, the ratio of the peak intensity of Ru oxide of the Miller index (101) plane observed in the angle domain of 2θ=35° to the peak intensity of Ru oxide of the Miller index (110) plane observed in the angle domain of 2θ=28° in an X-ray diffraction measurement is 1.5 or less.

3. The cathode for electrolysis according to claim 1, wherein the conductive substrate comprises Ni.

4. The cathode for electrolysis according to claim 1, wherein the amount of the element(s) of the second component is 0.01 mol or more and less than 1 mol in relation to 1 mol of the Ru element.

5. The cathode for electrolysis according to claim 1, wherein the amount of the element(s) of the third component is 0.01 mol or more and less than 1 mol in relation to 1 mol of the Ru element.

6. The cathode for electrolysis according to any one claim 1, wherein in the catalyst layer, at least either of the second component and the third component is present as an oxide or a hydroxide.

7. The cathode for electrolysis according to claim 1, wherein the Ru element in the catalyst layer is ruthenium oxide or ruthenium hydroxide.

8. The cathode for electrolysis according to claim 1, wherein the supported amount of the Ru element is 1 to 20 g/m$^2$.

9. An electrolytic cell for water or an aqueous alkali metal chloride solution, comprising the cathode for electrolysis according to claim 1.

10. A method for producing a cathode for electrolysis, wherein a catalyst layer is formed on a conductive substrate through:
    an application step of applying, onto the conductive substrate, an application liquid comprising as a first component the Ru element, as a second component at least one or more elements selected from Nd, Pm, Sm, Eu, Gd, Tb and Dy, and as a third component at least one or more elements selected from Mn, Fe, Co, Zn, Ga, S and Pb;
    a film formation step of forming a coating film by drying the application liquid; and
    a thermal decomposition step of heating and thermally decomposing the coating film;
    wherein in the catalyst layer, the ratio of the maximum intensity of the Ru 3d 5/2 peak appearing between 281.4 eV and 282.4 eV to the maximum intensity of the Ru 3d 5/2 peak appearing between 280.0 eV and 281.0 eV, in an X-ray photoelectron spectroscopic measurement is 0.45 or more.

11. The method for producing a cathode for electrolysis according to claim 10,
    wherein the first component in the application liquid is at least one selected from a nitric acid salt, a dinitrodiammine complex, a nitrosyl nitrate, a chloride salt and an acetic acid salt;
    the second component is at least one selected from a nitric acid salt, a chloride salt and an acetic acid salt; and
    the third component is at least one selected from a nitric acid salt, a chloride salt and an acetic acid salt.

12. The method for producing a cathode for electrolysis according to claim 10, wherein the application step, the film formation step and the thermal decomposition step are repeated two or more times.

13. The method for producing a cathode for electrolysis according to claim 10, wherein the thermal decomposition step is performed at a temperature of 350°C. or higher and lower than 600°C.

14. The method for producing a cathode for electrolysis according to claim 10, wherein before the thermal decomposition step, a preliminary calcination is performed at a temperature of 100°C. or higher and lower than 350°C. for 1 minute to 60 minutes.

15. The method for producing a cathode for electrolysis according to claim 10, wherein in the film formation step, the drying of the application liquid is performed at a temperature of 100°C. or lower.

16. The cathode for electrolysis according to claim 5, wherein in the catalyst layer, at least either of the second component and the third component is present as an oxide or a hydroxide.

* * * * *

UNITED STATES PATENT AND TRADEMARK OFFICE
CERTIFICATE OF CORRECTION

PATENT NO. : 10,626,512 B2
APPLICATION NO. : 15/538249
DATED : April 21, 2020
INVENTOR(S) : A. Funakawa et al.

Page 1 of 1

It is certified that error appears in the above-identified patent and that said Letters Patent is hereby corrected as shown below:

In the Claims

Column 21, Line 11 (Claim 6), please change "to any one claim" to -- to claim --.

Signed and Sealed this
Sixth Day of October, 2020

Andrei Iancu
*Director of the United States Patent and Trademark Office*